United States Patent
Ji et al.

(10) Patent No.: US 8,335,176 B2
(45) Date of Patent: Dec. 18, 2012

(54) TRANSMISSION OF OVERHEAD CHANNELS WITH TIMING OFFSET AND BLANKING

(75) Inventors: Tingfang Ji, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 610 days.

(21) Appl. No.: 12/410,355

(22) Filed: Mar. 24, 2009

(65) Prior Publication Data

US 2009/0252075 A1    Oct. 8, 2009

Related U.S. Application Data

(60) Provisional application No. 61/043,102, filed on Apr. 7, 2008, provisional application No. 61/055,130, filed on May 21, 2008.

(51) Int. Cl.
    *H04H 20/71* (2008.01)
(52) U.S. Cl. ........ 370/312; 370/328; 370/345; 370/458; 455/63.1
(58) Field of Classification Search ........................ None
    See application file for complete search history.

(56) References Cited

U.S. PATENT DOCUMENTS

| | | | | |
|---|---|---|---|---|
| 6,697,642 | B1 * | 2/2004 | Thomas | 455/562.1 |
| 2001/0021179 | A1 * | 9/2001 | Tiedemann et al. | 370/333 |
| 2002/0021718 | A1 * | 2/2002 | Kerhuel et al. | 370/509 |
| 2003/0139140 | A1 * | 7/2003 | Chen et al. | 455/67.1 |
| 2006/0040696 | A1 * | 2/2006 | Lin | 455/522 |
| 2006/0189272 | A1 | 8/2006 | Willenegger et al. | |
| 2009/0252122 | A1 * | 10/2009 | Leinonen et al. | 370/332 |

FOREIGN PATENT DOCUMENTS

| | | |
|---|---|---|
| RU | 2216103 C2 | 11/2003 |
| WO | WO0013426 | 3/2000 |
| WO | WO2005062798 A2 | 7/2005 |
| WO | WO2007044281 | 4/2007 |
| WO | WO2007124111 A2 | 11/2007 |
| WO | WO2009070618 | 6/2009 |

OTHER PUBLICATIONS

International Search Report and Written Opinion—PCT/US2009/039818, International Search Authority—European Patent Office—Aug. 4, 2009.
Taiwan Search Report—TW098111563—TIPO—Jul. 4, 2012.

* cited by examiner

*Primary Examiner* — Chi H. Pham
*Assistant Examiner* — Shick Hom
(74) *Attorney, Agent, or Firm* — Kenneth Vu

(57) ABSTRACT

Techniques for mitigating interference in a wireless network are described. In an aspect, interference on overhead channels may be mitigated by (i) sending the overhead channels from different base stations in non-overlapping time intervals and (ii) having each interfering base station reduce its transmit power during time intervals in which the overhead channels are sent by neighbor base stations. In one design, a first base station may send an overhead channel in a first time interval, and a second base station may send the overhead channel in a second time interval that is non-overlapping with the first time interval. The base stations may have different frame timing, which may be offset by an integer number of subframes and/or an integer number of symbol periods. Alternatively, the base stations may have the same frame timing, and the first and second time intervals may cover non-overlapping symbol periods with different indices.

12 Claims, 12 Drawing Sheets

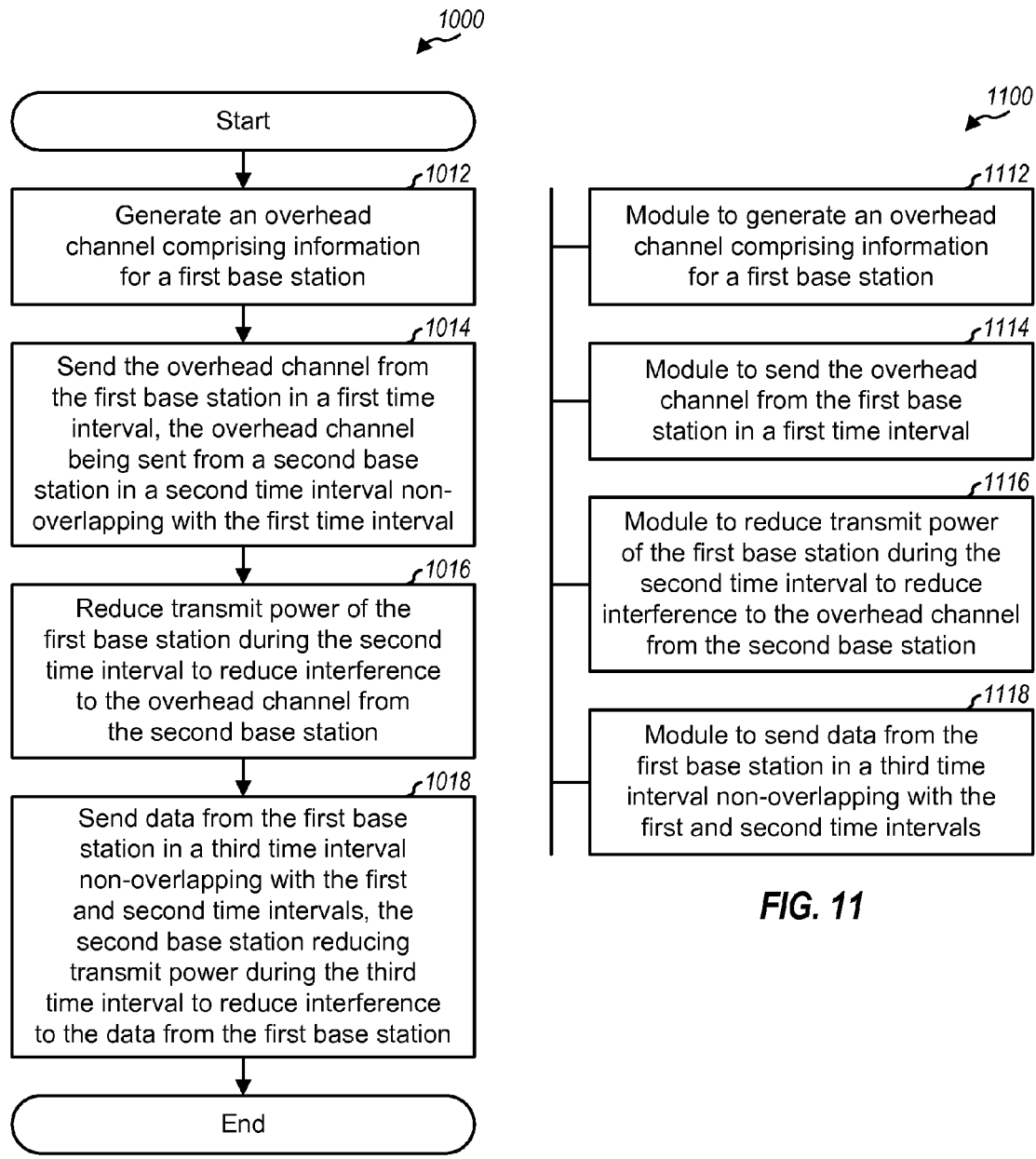

TRANSMISSION OF OVERHEAD CHANNELS WITH TIMING OFFSET AND BLANKING

The present application claims priority to provisional U.S. Application Ser. No. 61/043,102, entitled "RANGE EXTENSION WITH TIMING OFFSET," filed Apr. 7, 2008, and provisional U.S. Application Ser. No. 61/055,130, entitled "LONG TERM INTERFERENCE AVOIDANCE WITH FORWARD LINK CONTROL BLANKING," filed May 21, 2008, both assigned to the assignee hereof and incorporated herein by reference.

BACKGROUND

I. Field

The present disclosure relates generally to communication, and more specifically to techniques for transmitting overhead channels in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A base station may transmit various overhead channels to UEs within its coverage. The overhead channels from the base station may observe interference due to transmissions from neighbor base stations. The interference may be strong at some UEs and may degrade the performance of these UEs. There is therefore a need in the art for techniques to mitigate interference on the overhead channels in order to improve performance.

SUMMARY

Techniques for mitigating interference on overhead channels in a wireless communication network are described herein. A base station may transmit various overhead channels to UEs within its coverage. An overhead channel may comprise any channel or signal used to support network operation and may be sent to all UEs. For example, an overhead channel may be a broadcast channel, a control channel, a synchronization channel, a paging channel, etc. A channel may also be referred to as a signal, a transmission, etc.

In an aspect, interference on the overhead channels may be mitigated by (i) sending the overhead channels from different base stations in non-overlapping time intervals and (ii) having each interfering base station reduce its transmit power during the time intervals in which the overhead channels are sent by neighbor base stations. This may allow UEs to reliably receive the overhead channels from the base stations even in dominant interference scenarios.

In one design, a UE may receive an overhead channel from a first base station in a first time interval. The overhead channel may be sent from a second base station in a second time interval that is non-overlapping with the first time interval. The UE may process the overhead channel from the first base station to recover information for the first base station.

The first base station may have a first frame timing, and the second base station may have a second frame timing. In one design, the first frame timing may be offset from the second frame timing by an integer number of subframes. In this design, the first and second time intervals may belong in non-overlapping subframes with the same subframe index determined based on the first and second frame timing. In another design, the first frame timing may be offset from the second frame timing by an integer number of symbol periods. In this design, the first and second time intervals may cover non-overlapping symbol periods with the same symbol period index determined based on the first and second frame timing. In yet another design, the first frame timing may be offset from the second frame timing by an integer number of subframes and an integer number of symbol periods. In this design, the first and second time intervals may belong in non-overlapping subframes with the same subframe index or may cover non-overlapping symbol periods with the same symbol period index. In yet another design, the first and second base stations may have the same frame timing, and the first and second time intervals may cover non-overlapping symbol periods with different symbol period indices. The first and second time intervals may also be defined in other manners.

In one scenario, the first base station may be a low-power base station and the second base station may be a high-power base station. In another scenario, the first base station may have unrestricted access and the second base station may have restricted access. In both scenarios, the second base station may reduce its transmit power during the first time interval in order to reduce interference to the overhead channel from the first base station. The first base station may also reduce its transmit power during the second time interval in order to reduce interference to the overhead channel from the second base station.

The techniques described herein may also be used to mitigate interference on reference signals/pilots and possibly data channels. Various aspects and features of the disclosure are described in further detail below.

BRIEF DESCRIPTION OF THE DRAWINGS

FIG. 10 shows a process for sending an overhead channel.
FIG. 11 shows an apparatus for sending an overhead channel.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
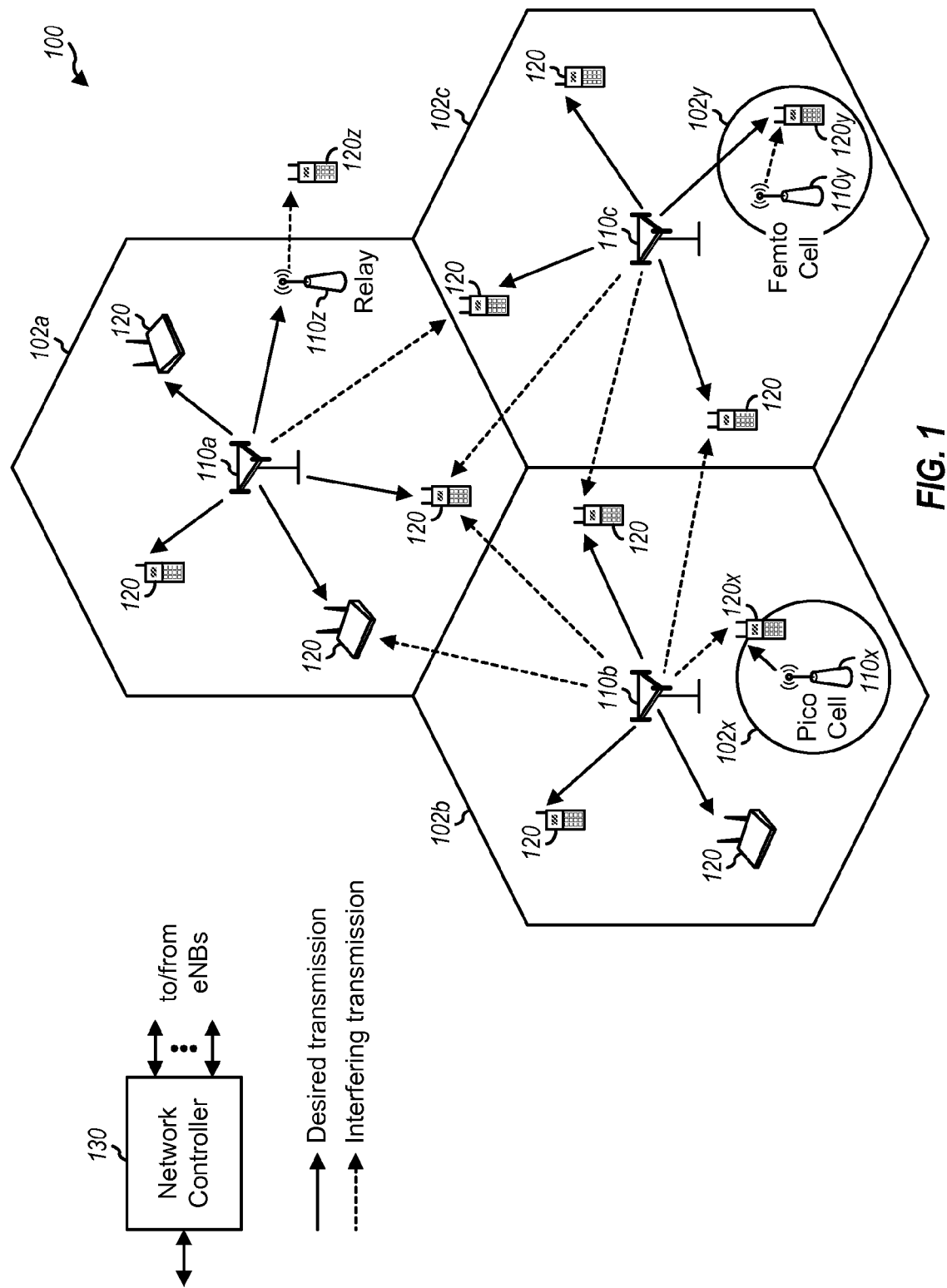
FIG. 1 shows a wireless communication network.

FIG. 1 shows a wireless communication network 100, which may be an LTE network or some other network. Wireless network 100 may include a number of evolved Node Bs (eNBs) 110 and other network entities. An eNB may be a station that communicates with the UEs and may also be referred to as a base station, a Node B, an access point, etc. Each eNB 110 provides communication coverage for a particular geographic area. The term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell, e.g., UEs belonging to a closed subscriber group (CSG). An eNB for a macro cell may be referred to as a macro eNB. An eNB for a pico cell may be referred to as a pico eNB. An eNB for a femto cell may be referred to as a femto eNB or a home eNB. In the example shown in FIG. 1, eNBs 110a, 110b and 110c may be macro eNBs for macro cells 102a, 102b and 102c, respectively. eNB 110x may be a pico eNB for a pico cell 102x. eNB 110y may be a femto eNB for a femto cell 102y. Different types of eNBs may have different transmit power levels. For example, macro eNBs may have a high transmit power level (e.g., 20 Watts) whereas pico and femto eNBs may have a low transmit power level (e.g., 1 Watt).

Wireless network 100 may also include relay stations. A relay station is a station that receives transmission of data and/or other information from an upstream station and sends transmission of the data and/or other information to a downstream station. The upstream station may be an eNB, another relay station, or a UE. The downstream station may be a UE, another relay station, or an eNB. A relay station may also be a terminal that relays transmissions for other terminals.

A network controller 130 may couple to a set of eNBs and provide coordination and control for these eNBs. Network controller 130 may be a single network entity or a collection of network entities. Network controller 130 may communicate with eNBs 110 via a backhaul. eNBs 110 may also communicate with one another, e.g., directly or indirectly via wireless or wireline interface.

UEs 120 may be dispersed throughout the wireless network, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may communicate with an eNB via the downlink and uplink. The downlink (or forward link) refers to the communication link from the eNB to the UE, and the uplink (or reverse link) refers to the communication link from the UE to the eNB. In FIG. 1, a solid line with a single arrow indicates a desired transmission from an eNB to a UE. A dashed line with a single arrow indicates an interfering transmission from an eNB to a UE. Uplink transmissions are not shown in FIG. 1 for simplicity.

Figure 2:
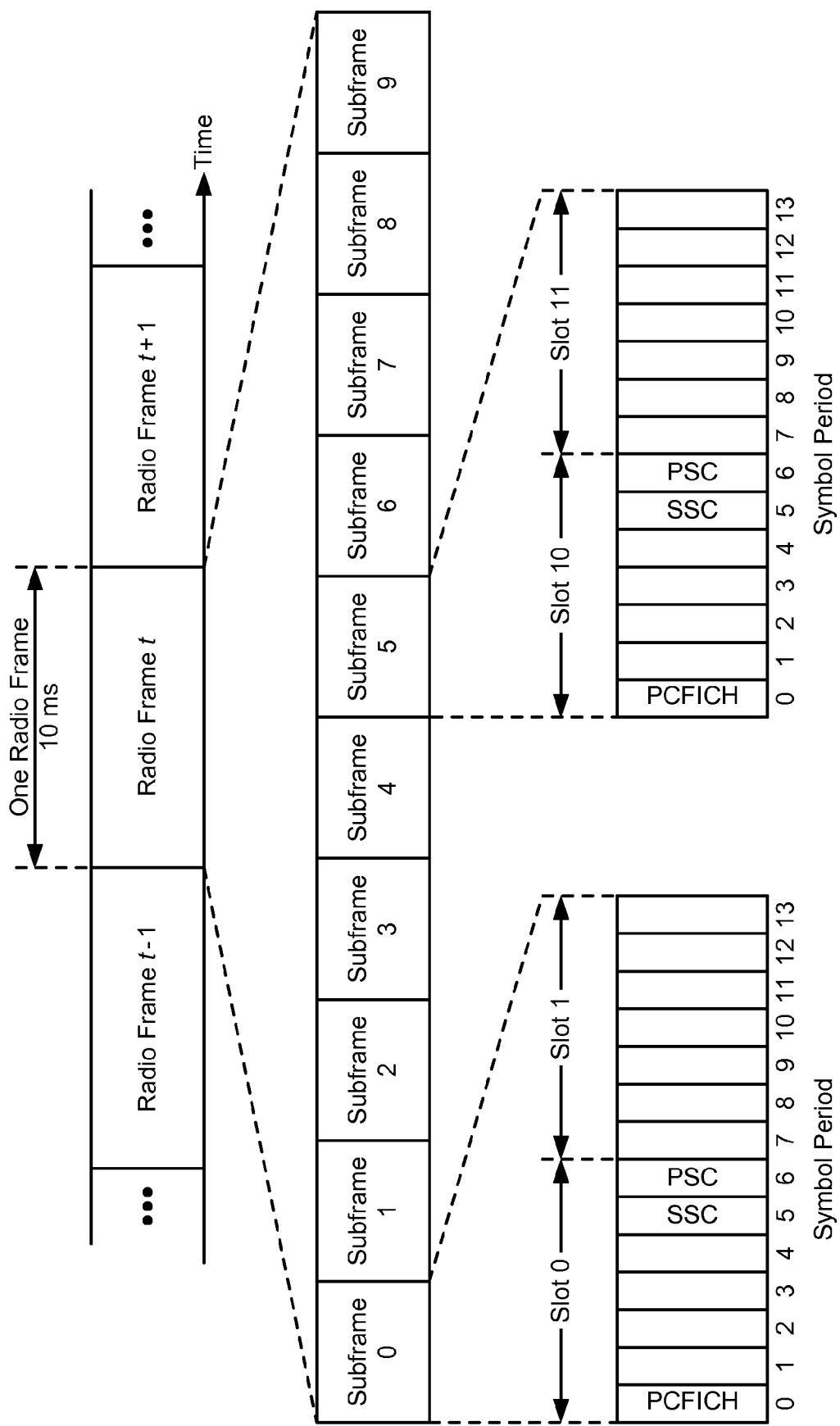
FIG. 2 shows an example frame structure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L-1.

In LTE, a primary synchronization signal (denoted as "PSC") and a secondary synchronization signal (denoted as "SSC") may be sent in symbol periods 6 and 5, respectively, in each of subframes 0 and 5 in each radio frame with the normal cyclic prefix, as shown in FIG. 2. The synchronization signals may be used by the UEs for acquisition. A physical broadcast channel (PBCH) may be sent in four symbol periods in slot 1 of four consecutive radio frames. The PBCH may carry a broadcast channel (BCH), which may further carry a master information block (MIB) containing the number of resource blocks, the number of transmit antennas, a system frame number, other system information, etc.

A physical control format indicator channel (PCFICH), a physical downlink control channel (PDCCH), and a physical HARQ indicator channel (PHICH) may be sent in the first M symbol periods of each subframe, where $1 \leq M \leq 3$. For simplicity, only the PCFICH is shown in FIG. 2. The PCFICH may convey the OFDM symbol(s) used for the PDCCH. The PDCCH may carry information on resource allocation for UEs and for downlink channels. The PHICH may carry information to support hybrid automatic retransmission (HARQ). The synchronization signals, PBCH, PCFICH, PDCCH and PHICH may be considered as different types of overhead channels. Other overhead channels may also be sent on the downlink. The overhead channels in LTE are described in 3GPP TS 36.211, entitled "Evolved Universal Terrestrial Radio Access (E-UTRA); Physical Channels and Modulation," which is publicly available.

Figure 3:
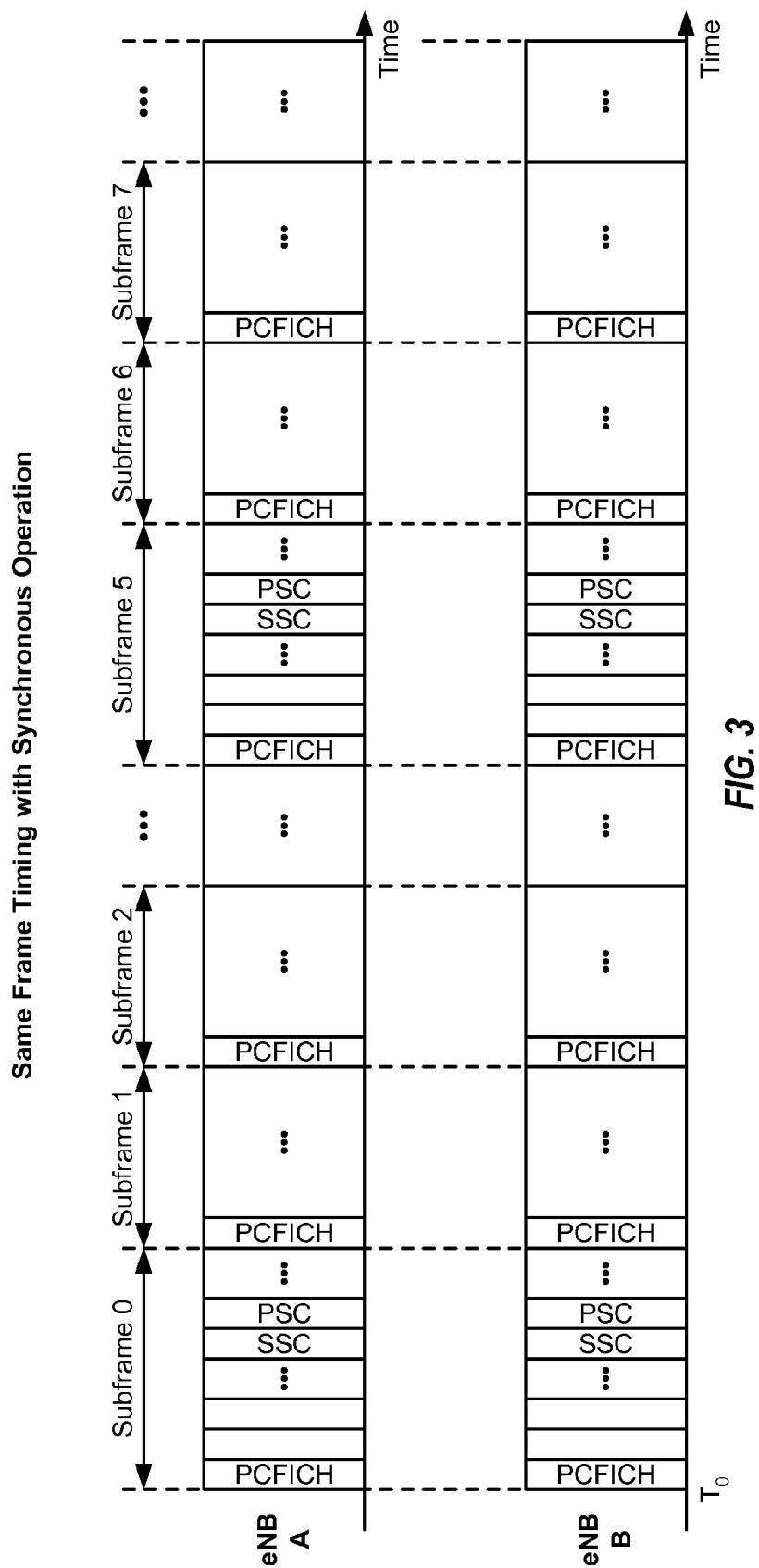
FIG. 3 shows transmission of overhead channels by two base stations.

FIG. 3 shows transmission of overhead channels by two eNBs A and B in a synchronous network. The eNBs may have the same frame timing in a synchronous network, and subframe 0 may start at approximately the same time $T_0$ for both eNBs. In this case, the PSC, SSC, PBCH and PCFICH of the two eNBs would be aligned in time (as shown in FIG. 3) and may interfere with each other at the UEs.

Wireless network 100 may be a heterogeneous network with different types of eNBs, e.g., macro eNBs, pico eNBs, femto eNBs, etc. These different types of eNBs may transmit at different power levels, have different coverage areas, and have different impact on interference in the wireless network.

A UE may be within the coverage of multiple eNBs. One of these eNBs may be selected to serve the UE. The serving eNB may be selected based on various criteria such as signal-to-noise ratio (SNR), pathloss, etc.

The UE may operate in a dominant interference scenario in which the UE may observe high interference from one or more interfering eNBs. A dominant interference scenario may occur due to range extension, which is a scenario in which the UE connects to an eNB with lower pathloss and lower SNR. The UE may receive signals from two eNBs X and Y and may obtain lower received power for eNB X than eNB Y. Nevertheless, it may be desirable for the UE to connect to eNB X if the pathloss for eNB X is lower than the pathloss for eNB Y. This may be the case if eNB X (which may be a pico eNB) has much lower transmit power as compared to eNB Y (which may be a macro eNB). By having the UE connect to eNB X with lower pathloss, less interference may be caused to the network to achieve a given data rate.

A dominant interference scenario may also occur due to restricted association. The UE may be close to eNB Y and may have high received power for eNB Y. However, eNB Y may have restricted access, and the UE may not be allowed to connect to eNB Y. The UE may then connect to unrestricted eNB X with lower received power and may then observe high interference from eNB Y.

In an aspect, interference on overhead channels may be mitigated by (i) sending the overhead channels from different eNBs in non-overlapping time intervals and (ii) having each interfering eNB reduce its transmit power during the time intervals in which the overhead channels are sent by neighbor eNBs. This may allow the UEs to reliably receive the overhead channels from the eNBs even in dominant interference scenarios.

In one design, subframe offset may be used to mitigate interference on overhead channels sent in only some of the subframes. With subframe offset, the frame timing of an eNB may be shifted by an integer number of subframes with respect to the frame timing of another eNB. Subframe offset may be used to mitigate interference on the PSC, SSC, PCFICH and other overhead channels sent in subframes 0 and 5 of each frame.

Figure 4A:
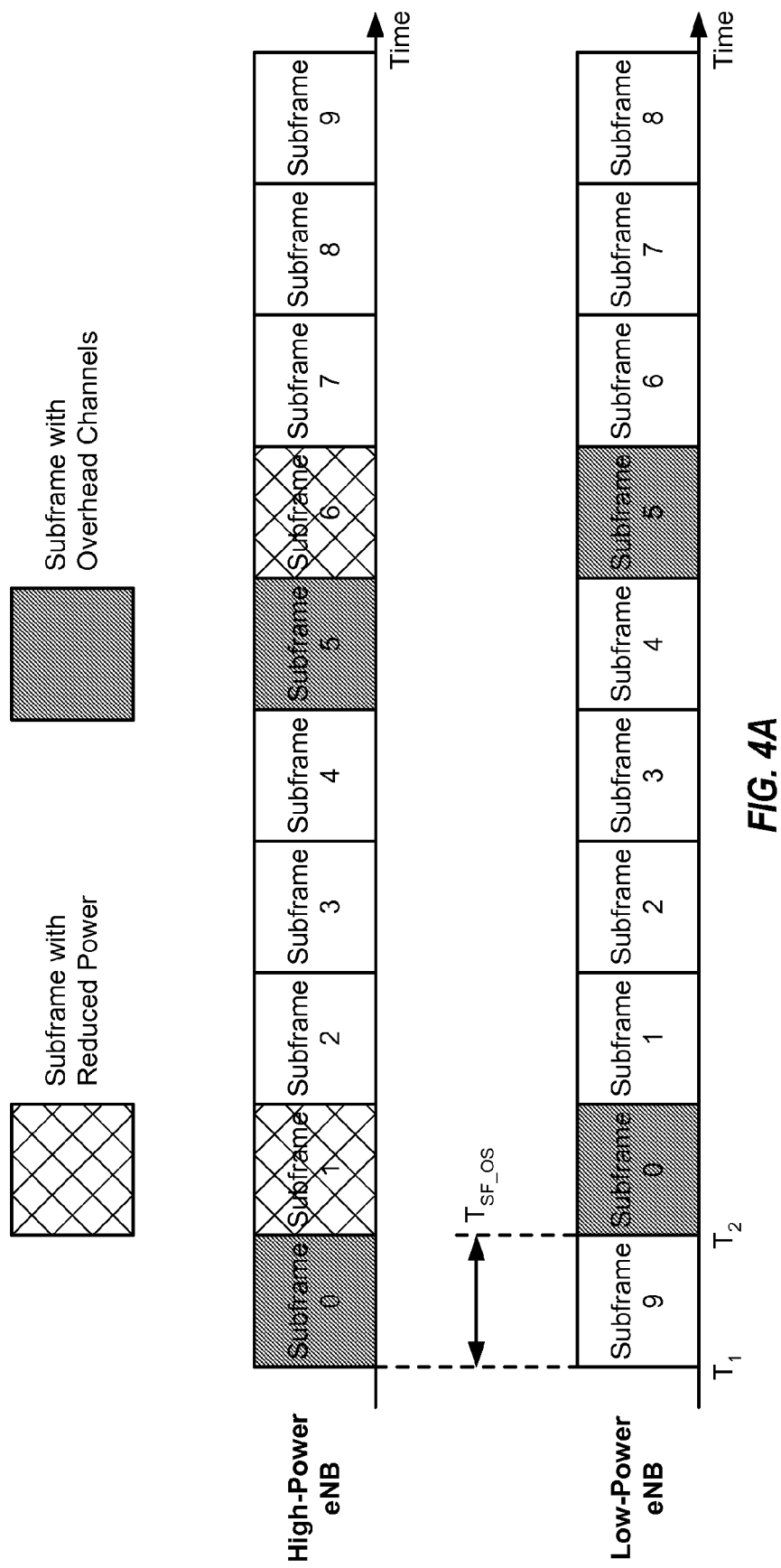
FIGS. 4A and 4B show transmission of overhead channels with subframe offset.

FIG. 4A shows a design of transmission of overhead channels with subframe offset in a range extension scenario. In this design, a high-power eNB (e.g., a macro eNB) may have a first frame timing with the start of subframe 0 occurring at time $T_1$. A low-power eNB (e.g., a pico or femto eNB) may have a second frame timing with the start of subframe 0 occurring at time $T_2$. The second frame timing may be offset from the first frame timing by an offset of $T_{SF\_OS}$, which may be equal to one subframe in the example shown in FIG. 4A. The subframes of the low-power eNB may thus be shifted by one subframe from the subframes of the high-power eNB. For example, subframe 0 of the low-power eNB may be time aligned with subframe 1 of the high-power eNB, subframe 1 of the low-power eNB may be time aligned with subframe 2 of the high-power eNB, etc.

The high-power eNB may send its overhead channels in subframes 0 and 5 determined based on the first frame timing. The low-power eNB may have much lower transmit power and may not cause high interference to the overhead channels of the high-power eNB. The low-power eNB may transmit in subframes 9 and 4, which may overlap with subframes 0 and 5 of the high-power eNB.

The low-power eNB may send its overhead channels in subframes 0 and 5 determined based on the second frame timing. Subframes 0 and 5 of the low-power eNB may overlap with subframes 1 and 6 of the high-power eNB. The high-power eNB may cause high interference to the overhead channels of the low-power eNB and may thus reduce its transmit power in subframes 1 and 6. UEs receiving the overhead channels from the low-power eNB may then observe less interference from the high-power eNB.

Figure 4B:
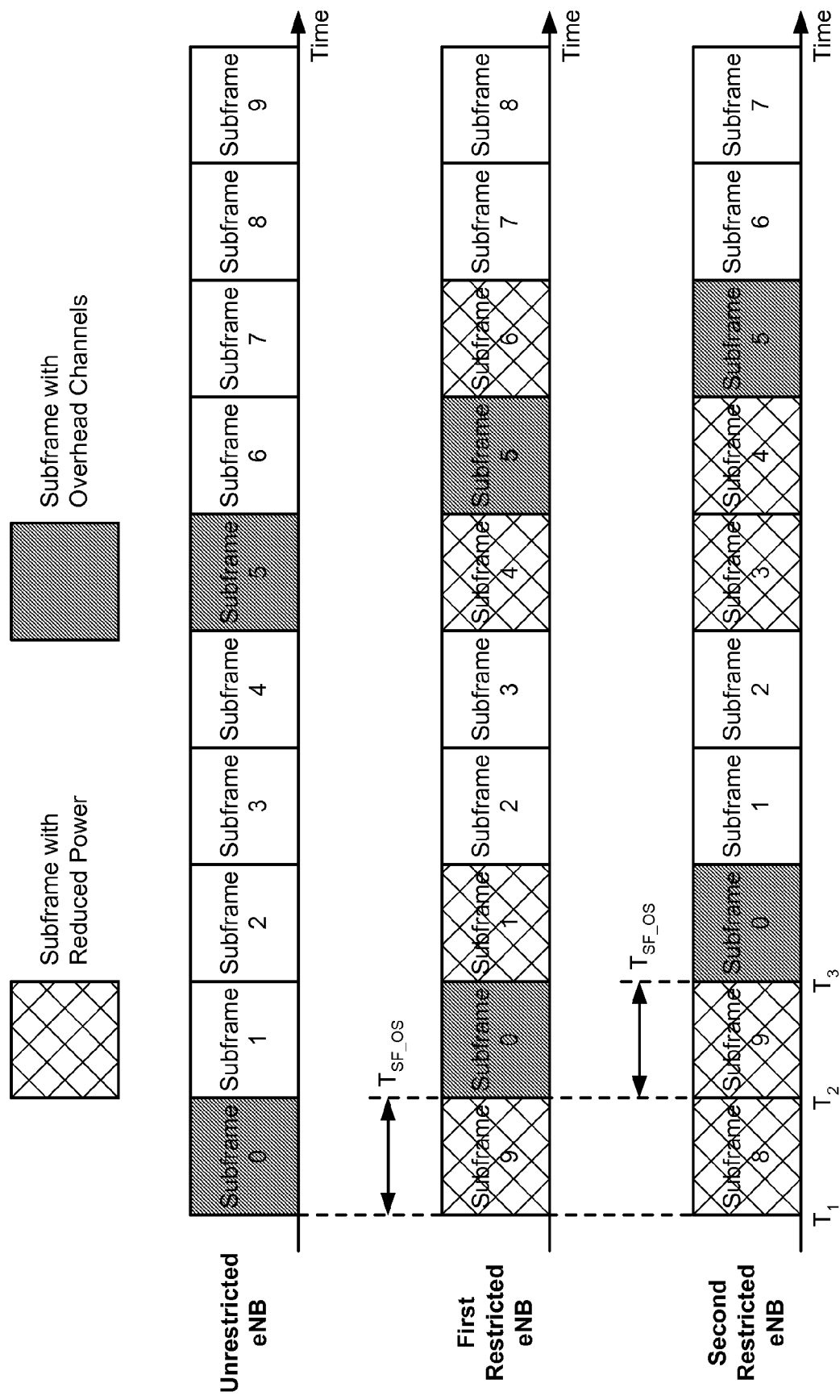

FIG. 4B shows a design of transmission of overhead channels with subframe offset in a restricted association scenario. In this design, an unrestricted eNB (e.g., a macro eNB) may have a first frame timing with the start of subframe 0 occurring at time $T_1$. A first restricted eNB (e.g., a femto eNB) may have a second frame timing with the start of subframe 0 occurring at time $T_2$. A second restricted eNB (e.g., another femto eNB) may have a third frame timing with the start of subframe 0 occurring at time $T_3$. The second frame timing may be offset from the first frame timing by an offset of $T_{SF\_OS}$, which may be equal to one subframe. The third frame timing may be offset from the second frame timing by an offset of $T_{SF\_OS}$. The subframes of the first restricted eNB may thus be shifted by one subframe from the subframes of the unrestricted eNB. The subframes of the second restricted eNB may also be shifted by one subframe from the subframes of the first restricted eNB.

The unrestricted eNB may send its overhead channels in subframes 0 and 5 determined based on the first frame timing. The first and second restricted eNBs may cause high interference to UEs that are near their vicinity but cannot access these restricted eNBs. These UEs may connect to the unrestricted eNB and may observe high interference from the restricted eNBs. The first restricted eNB may thus reduce its transmit power in its subframes 9 and 4, which may overlap with subframes 0 and 5 of the unrestricted eNB. The second restricted eNB may reduce its transmit power in its subframes 8 and 3, which may overlap with subframes 0 and 5 of the unrestricted eNB. UEs receiving the overhead channels from the unrestricted eNB may then observe less interference from the restricted eNBs.

The first restricted eNB may send its overhead channels in subframes 0 and 5 determined based on the second frame timing. The unrestricted eNB may not cause high interference to the overhead channels of the first restricted eNB and may thus be able to transmit in its subframes 1 and 6, which may overlap with subframes 0 and 5 of the first restricted eNB. The second restricted eNB may cause high interference to the overhead channels of the first restricted eNB and may thus reduce its transmit power in its subframes 9 and 4, which may overlap with subframes 0 and 5 of the first restricted eNB. UEs receiving the overhead channels from the first restricted eNB may then observe less interference from the second restricted eNB.

The second restricted eNB may send its overhead channels in subframes 0 and 5 determined based on the third frame timing. The unrestricted eNB may not cause high interference to the overhead channels of the second restricted eNB and may thus be able to transmit in its subframes 2 and 7, which may overlap with subframes 0 and 5 of the second restricted eNB. The first restricted eNB may cause high interference to the overhead channels of the second restricted eNB and may thus reduce its transmit power in its subframes 1 and 6, which may overlap with subframes 0 and 5 of the second restricted eNB. UEs receiving the overhead channels from the second restricted eNB may then observe less interference from the first restricted eNB.

FIGS. 4A and 4B show designs in which the frame timing of different eNBs is offset by one subframe from one other. In general, the frame timing of different eNBs may be offset by any suitable amount. For example, the frame timing may be offset by multiple subframes or a fraction of a subframe (e.g., a slot).

In another design, symbol offset may be used to mitigate interference on overhead channels sent in only some of the symbol periods in a subframe. With symbol offset, the frame timing of an eNB may be shifted by an integer number of symbol periods with respect to the frame timing of another eNB. Symbol offset may be used to avoid collision of the overhead channels (e.g., the PCFICH, PHICH and PDCCH) sent in symbol periods 0 through M-1 of each subframe. Symbol offset may also be used to avoid or mitigate interference on a cell-specific reference signal that may be sent in some designated symbol periods of each subframe, except for Multicast Broadcast Multimedia Services (MBMS) Single Frequency Network (MBSFN) subframes.

Figure 5A:
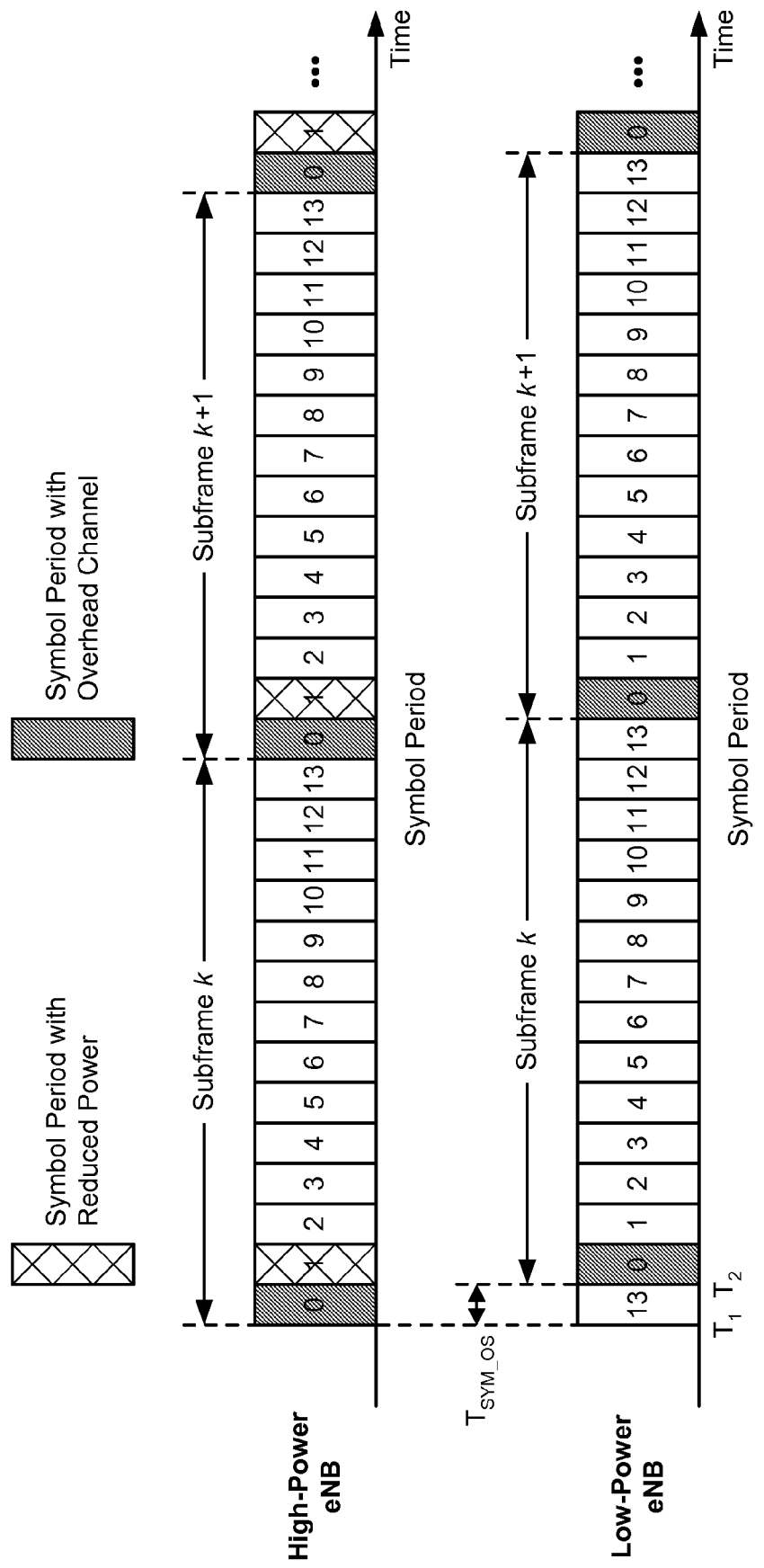
FIGS. 5A and 5B show transmission of overhead channels with symbol offset.

FIG. 5A shows a design of transmission of overhead channels with symbol offset in a range extension scenario. In this design, a high-power eNB may have a first frame timing with the start of subframe 0 occurring at time $T_1$. A low-power eNB may have a second frame timing with the start of subframe 0 occurring at time $T_2$. The second frame timing may be offset or delayed from the first frame timing by an offset of $T_{SYM\_OS}$, which may be equal to one symbol period in the example shown in FIG. 5A. Alternatively, the second frame timing may be advanced relative to the first frame timing by $T_{SYM\_OS}$. In either case, the subframes of the low-power eNB may be shifted by one symbol period from the subframes of the high-power eNB.

In the example shown in FIG. 5A, the high-power eNB may send an overhead channel (e.g., the PCFICH) in symbol period 0 of each subframe determined based on the first frame timing. The low-power eNB may not cause high interference to the overhead channel of the high-power eNB and may thus transmit in symbol period 13 of each subframe, which may overlap with symbol period 0 of each subframe of the high-power eNB.

The low-power eNB may send an overhead channel in symbol period 0 of each subframe determined based on the second frame timing, which may overlap with symbol period 1 of each subframe of the high-power eNB. The high-power eNB may cause high interference to the overhead channel of the low-power eNB and may thus reduce its transmit power in symbol period 1 of each subframe in order to reduce interference to the low-power eNB. UEs receiving the overhead channel from the low-power eNB may then observe less interference from the high-power eNB. The high-power eNB may transmit at a nominal power level in the remaining symbol periods of each subframe. Alternatively, the high-power eNB may reduce its transmit power for the rest of a subframe in order to reduce interference to a data channel and/or a reference signal from the low-power eNB.

Figure 5B:
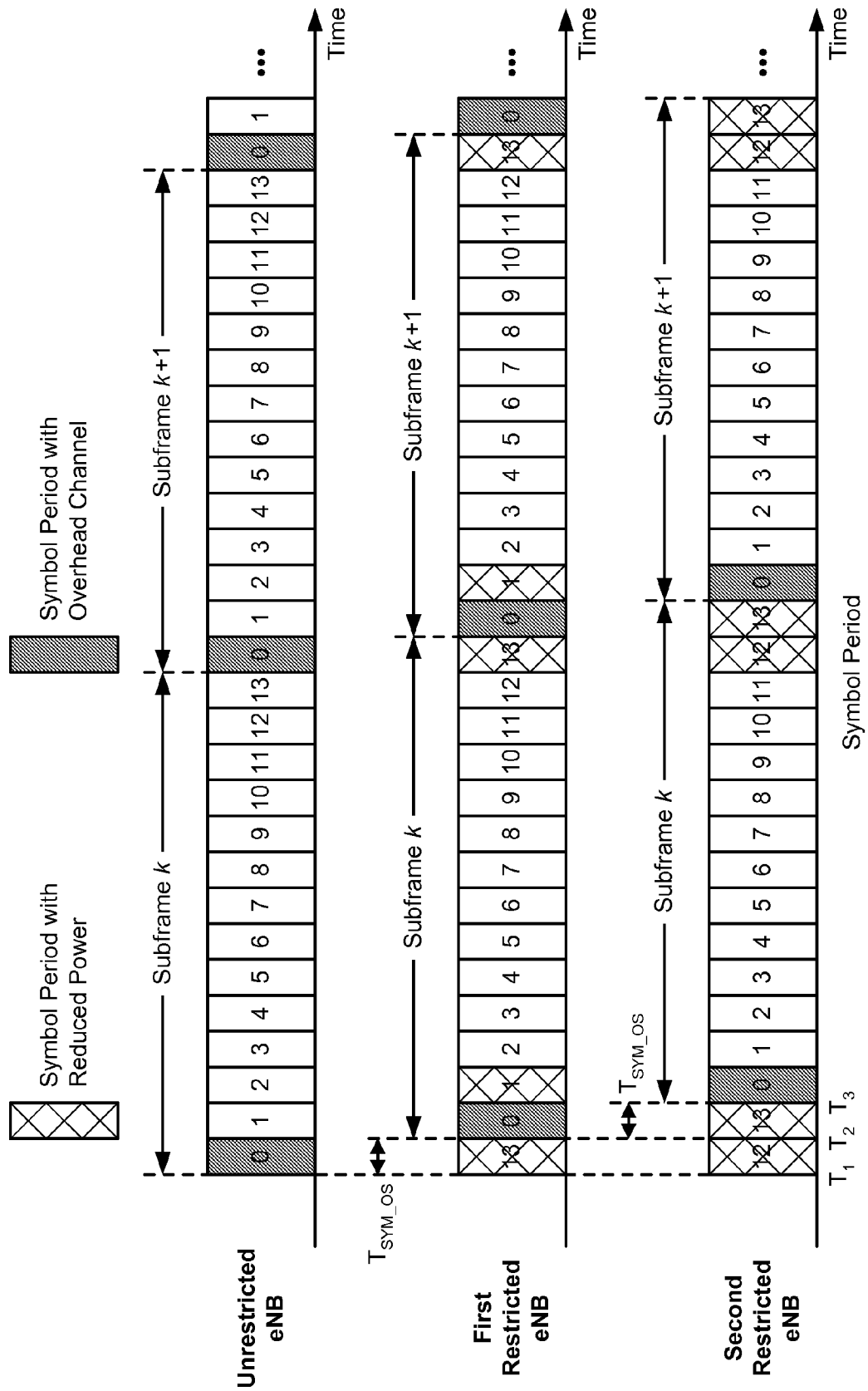

FIG. 5B shows a design of transmission of overhead channels with symbol offset in a restricted association scenario. In this design, an unrestricted eNB may have a first frame timing with the start of subframe 0 occurring at time $T_1$. A first restricted eNB may have a second frame timing with the start of subframe 0 occurring at time $T_2$. A second restricted eNB may have a third frame timing with the start of subframe 0 occurring at time $T_3$. The second frame timing may be offset from the first frame timing by an offset of $T_{SYM\_OS}$, which may be equal to one symbol period. The third frame timing may be offset from the second frame timing by an offset of $T_{SYM\_OS}$. The subframes of the second restricted eNB may thus be shifted by one symbol period from the subframes of the first restricted eNB, which may be shifted by one symbol period from the subframes of the unrestricted eNB.

The unrestricted eNB may send an overhead channel in symbol period 0 of each subframe determined based on the first frame timing. The first and second restricted eNBs may cause high interference to UEs located near their vicinity but connected to the unrestricted eNB due to inability to access the restricted eNBs. The first restricted eNB may thus reduce its transmit power in symbol period 13 of each subframe. The second restricted eNB may reduce its transmit power in symbol period 12 of each subframe. UEs receiving the overhead channel from the unrestricted eNB may then observe less interference from the restricted eNBs.

The first restricted eNB may send an overhead channel in symbol period 0 of each subframe determined based on the second frame timing. The unrestricted eNB may not cause high interference to the overhead channel of the first restricted eNB and may thus be able to transmit in symbol period 1 of each subframe. The second restricted eNB may cause high interference to the overhead channel of the first restricted eNB and may thus reduce its transmit power in symbol period 13 of each subframe. UEs receiving the overhead channel from the first restricted eNB may then observe less interference from the second restricted eNB.

The second restricted eNB may send an overhead channel in symbol period 0 of each subframe determined based on the third frame timing. The unrestricted eNB may not cause high interference to the overhead channel of the second restricted eNB and may thus be able to transmit in symbol period 2 of each subframe. The first restricted eNB may cause high interference to the overhead channel of the second restricted eNB and may thus reduce its transmit power in symbol period 1 of each subframe. UEs receiving the overhead channel from the second restricted eNB may then observe less interference from the first restricted eNB.

FIGS. 5A and 5B show designs in which the frame timing of different eNBs is offset by one symbol period from one other. In general, the frame timing of different eNBs may be offset by any suitable amount in order to avoid interference on the overhead channel(s). For example, the frame timing may be offset by M symbol periods if the overhead channel(s) are sent in M symbol periods.

In yet another design, a combination of subframe offset and symbol offset may be used to mitigate interference on overhead channels. Subframe offset may be used to mitigate interference on overhead channels sent in certain subframes. Symbol offset may be used to mitigate interference on overhead channels sent in certain symbol periods of a subframe.

Figure 6:
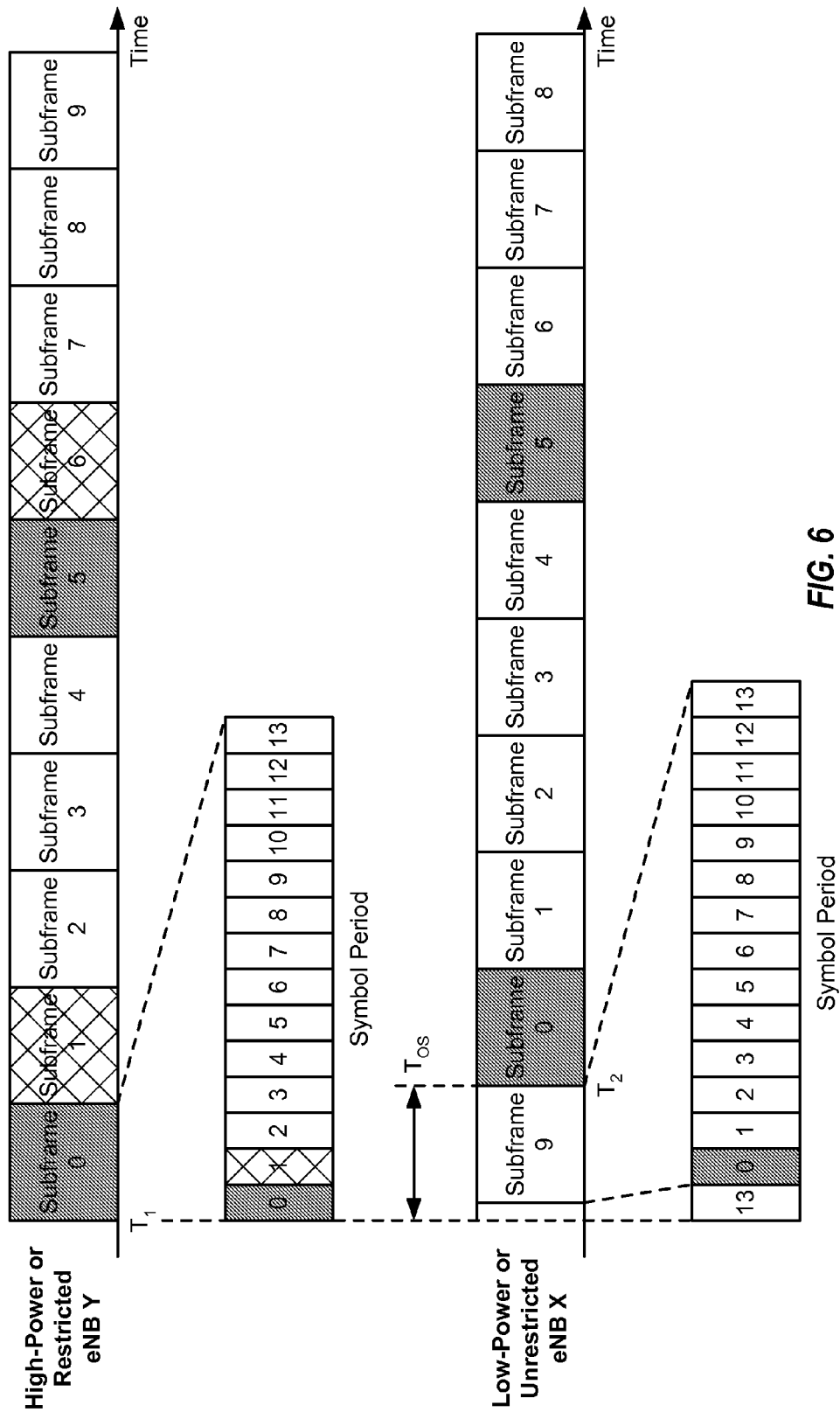
FIG. 6 shows transmission of overhead channels with subframe offset and symbol offset.

FIG. 6 shows a design of transmission of overhead channels with subframe offset and symbol offset. In this design, a high-power or restricted eNB Y (e.g., a macro eNB or a femto eNB) may have a first frame timing with the start of subframe 0 occurring at time $T_1$. A low-power or unrestricted eNB X (e.g., a pico eNB) may have a second frame timing with the start of subframe 0 occurring at time $T_2$. The second frame timing may be offset from the first frame timing by an offset of $T_{OS}$, which may be equal to one subframe plus one symbol period in the example shown in FIG. 6.

In the example shown in FIG. 6, eNB Y may send an overhead channel (e.g., the PCFICH) in symbol period 0 of each subframe and may send other overhead channels (e.g., the PSC, SSC and PBCH) in subframes 0 and 5 determined based on the first frame timing. eNB X may not cause high interference to the overhead channels of eNB Y and may thus transmit during the time intervals in which eNB Y sends the overhead channels.

eNB X may send an overhead channel in symbol period 0 of each subframe and may send other overhead channels in subframes 0 and 5 determined based on the second frame timing. eNB Y may cause high interference to the overhead channels of eNB X and may thus reduce its transmit power during the time intervals in which eNB X sends the overhead channels. UEs receiving the overhead channel from eNB X may then observe less interference from eNB Y.

In general, different eNBs may utilize only subframe offset (e.g., as shown in FIG. 4A or 4B), or only symbol offset (e.g., as shown in FIG. 5A or 5B), or both subframe offset and symbol offset (e.g., as shown in FIG. 6), or some other frame timing offset. The frame timing offset between different eNBs may be determined based on the time intervals (e.g., the symbol periods and subframes) in which overhead channels are sent, whether high interference is observed, etc. The frame timing offset may be applicable for any duration and may be conveyed to the affected eNBs, e.g., via the backhaul.

The designs in FIGS. 4A, 4B and 6 may enable reception of the overhead channels (e.g., the PSC, SSC and PBCH) from each eNB in subframes 0 and 5 without having to modify the LTE standards. The designs in FIGS. 5A, 5B and 6 may enable reception of the overhead channel (e.g., the PCFICH) from each eNB in symbol period 0 to M-1 of each subframe without having to modify the LTE standards. The designs in FIGS. 4A, 5A and 6 may also allow a UE to connect to a low-power eNB having low SNR in the presence of a high-power eNB causing high interference. The designs in FIGS. 4B, 5B and 6 may allow a UE located close to a restricted eNB to acquire overhead channels (e.g., the PSC, SSC, PBCH and PCFICH) from an unrestricted eNB and other restricted eNBs.

In yet another design, different eNBs may have the same frame timing but may send their overhead channels in different symbol periods with time division multiplexing (TDM) in order to avoid interference on the overhead channels. An interfering eNB may also reduce its transmit power in order to mitigate interference on the overhead channels.

Figure 7:
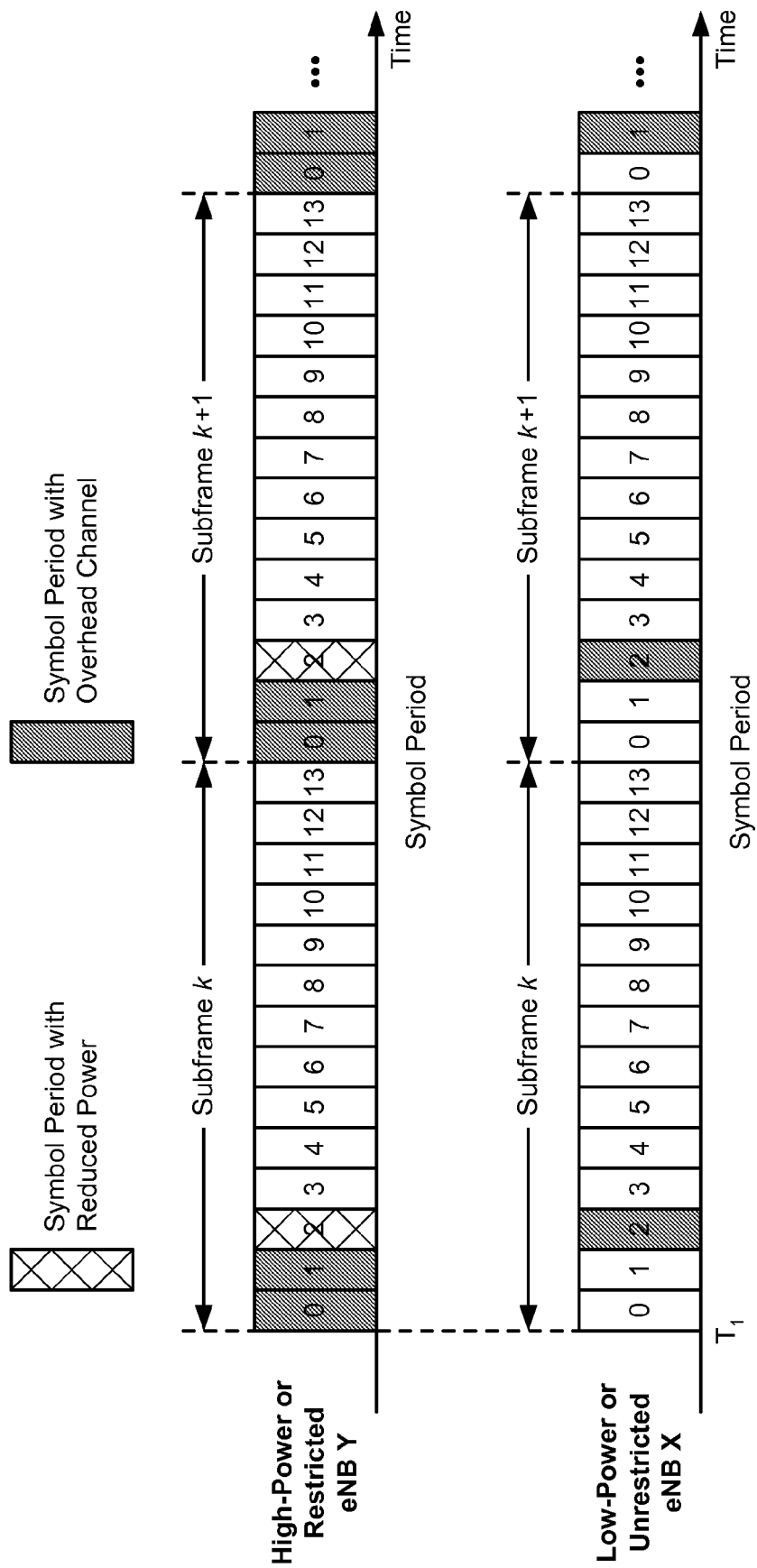
FIG. 7 shows transmission of overhead channels with time division multiplexing (TDM).

FIG. 7 shows transmission of overhead channels with TDM. In this design, a high-power or restricted eNB Y may send its overhead channel(s) in symbol periods 0 and 1 of a subframe. A low-power or unrestricted eNB X may (i) reduce its transmit power in symbol periods 0 and 1 or (ii) transmit during symbol periods 0 and 1 if it does not cause high interference to the overhead channel(s) of eNB Y. eNB X may send its overhead channel(s) in symbol period 2 of the subframe. eNB Y may cause high interference to the overhead channel(s) of eNB X and may thus reduce its transmit power in symbol period 2. UEs may be able to receive the overhead channels of eNBs X and Y with less interference. The remaining symbol periods in the subframe may be used for data transmission by eNB X and/or eNB Y, depending on the amount of interference caused by the eNBs.

In general, each eNB may be assigned any number of symbol periods to send its overhead channels. The number of symbol periods may be determined based on the amount of information to send in the overhead channels, the system bandwidth, the desired coverage, etc. Different eNBs may be assigned different symbol periods so that their overhead channels do not overlap in time, e.g., as shown in FIG. 7.

In one design, the symbol periods assigned to the eNBs may be conveyed via a control format indicator (CFI). Different CFI values may be defined for different sets of symbol periods to use for overhead channels. For example, a CFI value may specify the starting symbol period as well as the number of symbol periods to use for overhead channels by an eNB. The assigned symbol periods (or CFI values) for different eNBs may be sent, e.g., via the backhaul.

From the perspective of the overhead channels, the design in FIG. 7 with the same frame timing and different symbol periods for the overhead channels from different eNBs may be equivalent to the designs in FIGS. 5A and 5B with different frame timing and same symbol periods for the overhead channels. Thus, the frame timing of eNB X may be considered to be two symbol periods later than the frame timing of eNB Y in FIG. 7. However, other aspects of network operation may differ depending on whether the same or different frame timing is used for the eNBs. For example, certain transmissions may be sent in specific time intervals given relative to the start of subframe 0. These transmissions may be sent at different times and may or may not overlap depending on whether the same or different frame timing is used for the eNBs.

With TDM, the overhead channels (e.g., the PCFICH) of eNB X may collide with the overhead channels (e.g., the PSC, SSC and/or PBCH) of eNB Y in subframes 0 and 5. In this case, subframes 0 and 5 may be reserved for eNB Y, and eNB X may skip sending the overhead channels in these subframes in order to avoid causing interference to the overhead channels of eNB Y.

Wireless network 100 may utilize orthogonal frequency division multiplexing (OFDM) on the downlink. OFDM partitions the system bandwidth into multiple (K) orthogonal subcarriers, which are also commonly referred to as tones, bins, etc. Each subcarrier may be modulated with data. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 MHz, respectively.

An eNB may send one or more overhead channels on all or a subset of the K total subcarriers in a symbol period using OFDM. The eNB may or may not send other information in the remaining subcarriers not used for the overhead channel(s). Different eNBs may (i) send overhead channels in non-overlapping time intervals and (ii) send other transmissions concurrently in other time intervals. These eNBs may thus send transmissions in a different manner than base stations in a TDMA network, which may perform part (i) but not part (ii) above.

FIGS. 4A to 7 show example designs of mitigating interference on overhead channels. Interference mitigation may also be performed in other manners.

The techniques described herein may mitigate control-on-control interference, which is interference on an overhead channel from an eNB due to overhead channels from neighbor eNBs. In particular, control-on-control interference may be avoided by offsetting the frame timing of each eNB so that the overhead channels of adjacent eNBs are sent in non-overlapping time intervals. Non-overlapping of the overhead channels of different eNBs may be achieved with subframe offset in FIGS. 4A and 4B, symbol offset in FIGS. 5A and 5B, both subframe offset and symbol offset in FIG. 6, or TDM in FIG. 7. Non-overlapping of overhead channels may also be achieved in other manners.

The techniques described herein may also mitigate data-on-control interference, which is interference on an overhead channel from an eNB due to data from neighbor eNBs. In particular, data-on-control interference may be mitigated by having each interfering eNB reduce its transmit power in time intervals in which neighbor eNBs send their overhead channels, e.g., as shown in FIGS. 4A to 7. eNBs that do not cause high interference may not need to reduce their transmit power.

An interfering eNB may reduce data-on-control interference in a given time interval in various manners. In a first design, the eNB may reduce its transmit power during the time interval to a lower level or possibly zero. In a second design, the eNB may reduce interference by designating a subframe as an MBSFN subframe. The eNB may send only control information in a small part (e.g., in symbol period 0) of the MBSFN subframe and may avoid sending data and reference signals in the remaining part of the MBSFN subframe. The control information may identify the subframe as an MBSFN subframe and/or may provide other information. In a third design, the eNB may reduce it transmit power during the time interval and may send reference signals in the normal manner or at lower power during the time interval. In a fourth design, the eNB may spatially steer its transmission during the time interval in a manner to reduce interference to one or more UEs observing high interference from the eNB. For example, the eNB may perform precoding to place a spatial null in the direction of the affected UE(s). Data-on-control interference may also be mitigated in other manners. The time interval may cover the transmission time of the PSC, SSC, PBCH, PCFICH and/or other overhead channels.

Control-on-data interference, which is interference on data from an eNB due to overhead channels from neighbor eNBs, may also occur. For example, in FIG. 5A, a UE may receive data from the low-power eNB in symbol period 13 and may observe high interference from the overhead channel of the high-power eNB. Control-on-data interference may be mitigated in various manners. In a first design, the UE may discard data symbols observing high interference from overhead channels of neighbor eNBs. The UE may insert erasures for the discarded data symbols in the decoding process. An erasure may have equal likelihood of being '0' or '1'. The inserted erasures may thus result in the discarded data symbols being given no weight in the decoding process. The UE may estimate interference in each symbol period and may discard data symbols received in the symbol period if the estimated interference is sufficiently high (e.g., exceeds a high threshold). In a second design, an eNB may avoid sending data in symbol periods with high interference from overhead channels of neighbor eNBs. For the example in FIG. 5A, the low-power eNB may avoid sending data in symbol period 13 of each subframe.

Data-on-data interference, which is interference on data from an eNB due to data from neighbor eNBs, may also occur and may be mitigated in various manners. In one design, a serving eNB may send data to its UEs in assigned subframes that may have low interference from the data of interfering eNBs. The serving eNB may be a lower-power eNB, and the interfering eNBs may be high-power eNBs, e.g., as shown in FIGS. 4A and 5A. The serving eNB may also be an unrestricted eNB, and the interfering eNBs may be restricted eNBs, e.g., as shown in FIGS. 4B and 5B. In any case, each interfering eNB may reduce interference in the assigned subframes by (i) setting these subframes to MBSFN subframes and not transmitting data in the subframes, (ii) reducing transmit power in the subframes to a sufficiently low level or possibly zero, (iii) performing spatial steering in the subframes, and/or (iv) performing other actions to reduce interference in the subframes. The assigned subframes may be selected based on negotiation between the eNBs or by a network controller. The assigned subframes may also be selected based on various factors such as the loading at each eNB, the desired handoff boundary between the eNBs, the quality-of-service (QoS) requirements and/or the priority of the data and/or the UEs served by the eNBs, etc. The assigned subframes may be conveyed to the affected eNBs, e.g., via the backhaul.

In one design, interference mitigation may be performed independently for the overhead channels and data. Interference mitigation for the overhead channels may be performed as described above and may affect only time intervals in which the overhead channels are sent. These time intervals may cover only a portion of each affected subframe. Interference mitigation for data may be performed by assigning different subframes to different eNBs and/or by reducing transmit power. Each eNB may independently schedule its UEs for data transmission in its assigned subframes. Control information to support data transmission may be sent for each subframe with scheduled data and may be sent in similar manner as the overhead channels.

Figures 8, 9:
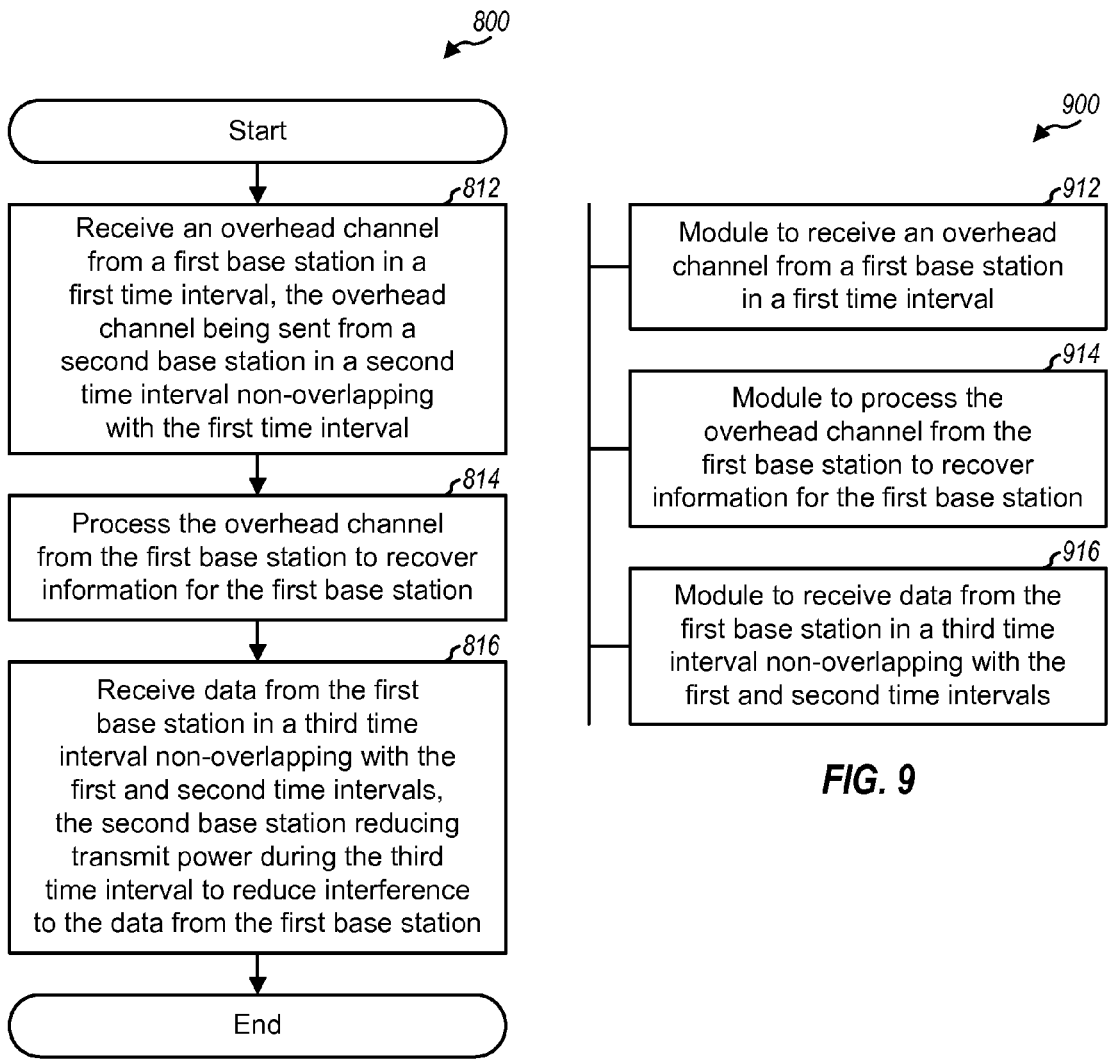
FIG. 8 shows a process for receiving an overhead channel.
FIG. 9 shows an apparatus for receiving an overhead channel.

FIG. 8 shows a design of a process 800 for receiving an overhead channel in a wireless communication network. Process 800 may be performed by a UE, as described below, or by some other entity. The UE may receive an overhead channel from a first base station (e.g., an eNB, a relay station, etc.) in a first time interval (block 812). The overhead channel may comprise the primary synchronization signal, the secondary synchronization signal, the PBCH, the PCFICH, the PDCCH, the PHICH and/or other channels or signals. The overhead channel may also be sent from a second base station (e.g., an eNB, a relay station, etc.) in a second time interval that is non-overlapping with the first time interval. The overhead channel may be sent by each base station with OFDM or some other multiplexing scheme. The UE may process the overhead channel from the first base station to recover information for the first base station (block 814).

The first base station may have a first frame timing, and the second base station may have a second frame timing. In one design, for subframe offset, the first frame timing may be offset from the second frame timing by an integer number of subframes, e.g., as shown in FIG. 4A or 4B. The first and second time intervals may belong in non-overlapping subframes with the same subframe index (e.g., subframe 0 in FIG. 4A) determined based on the first and second frame timing.

In another design, for symbol offset, the first frame timing may be offset from the second frame timing by an integer number of symbol periods, e.g., as shown in FIG. 5A or 5B. The first and second time intervals may cover non-overlapping symbol periods with the same symbol period index (e.g., symbol period 0 in FIG. 5A) determined based on the first and second frame timing.

In yet another design, for subframe offset and symbol offset, the first frame timing may be offset from the second frame timing by an integer number of subframes and an integer number of symbol periods, e.g., as shown in FIG. 6. The first and second time intervals may cover non-overlapping symbol periods with the same symbol period index (e.g., symbol period 0 in FIG. 6) determined based on the first and second frame timing. The first and second time intervals may also belong in non-overlapping subframes with the same subframe index (e.g., subframe 0 in FIG. 6) determined based on the first and second frame timing.

In yet another design, for TDM, the first and second base stations may have the same frame timing, e.g., as shown in FIG. 7. The first and second time intervals may cover non-overlapping symbol periods with different symbol period indices. For example, the first time interval may cover symbol periods 0 and 1, and the second time interval may cover symbol period 2 in FIG. 7. The first and second time intervals may also belong in non-overlapping subframes with different subframe indices.

The overhead channel may be sent by the first and second base stations in a subset of a plurality of subframes in each frame, e.g., in subframes 0 and 5 of each frame. The overhead channel may also be sent by the first and second base stations in a subset of a plurality of symbol periods in each subframe. In general, the overhead channel may be sent in one or more specific symbol periods in one or more specific subframes.

In one scenario, the first base station may have a first transmit power level that is lower than a second transmit power level of the second base station. In another scenario, the first base station may have unrestricted access and the second base station may have restricted access. In both scenarios, the second base station may reduce its transmit power during the first time interval in order to reduce interference to the overhead channel from the first base station. Alternatively or additionally, the first base station may reduce its transmit power during the second time interval in order to reduce interference to the overhead channel from the second base station. Each base station may reduce transmit power by lowering its transmit power (possibly to zero), by spatially steering its transmission away from the UE, or by setting a subframe covering the time interval in which the overhead channel is sent by the other base station as an MBSFN subframe.

The UE may also receive the overhead channel from the second base station in the second time interval and may process the overhead channel to recover information for the second base station. The type of information obtained for each base station may be dependent on the type of the overhead channel. For example, the overhead channel may comprise the primary and secondary synchronization signals. The UE may then detect for each base station based on the synchronization signals received from that base station. The overhead channel may also comprise the PBCH, PCFICH, PDCCH, PHICH, etc. The UE may then obtain broadcast information, control information, and/or other information from the overhead channel.

In one design, the UE may receive data from the first base station in a third time interval that may be non-overlapping with the first and second time intervals (block 816). The second base station may reduce its transmit power during the third time interval in order to reduce interference to the data from the first base station.

In another design, the UE may receive a reference signal from the first base station in a third time interval. The reference signal may be sent from the second base station in a fourth time interval that is non-overlapping with the third time interval. The UE may process the reference signal from the first base station to obtain channel information (e.g., a channel response estimate, a channel quality estimate, etc.) for the first base station.

FIG. 9 shows a design of an apparatus 900 for receiving an overhead channel in a wireless communication network. Apparatus 900 includes a module 912 to receive an overhead channel from a first base station in a first time interval, with the overhead channel being sent from a second base station in a second time interval non-overlapping with the first time interval, a module 914 to process the overhead channel from the first base station to recover information for the first base station, and a module 916 to receive data from the first base station in a third time interval non-overlapping with the first and second time intervals, with the second base station reducing its transmit power during the third time interval to reduce interference to the data from the first base station.

FIG. 10 shows a design of a process 1000 for sending an overhead channel in a wireless communication network. Process 1000 may be performed by a first base station (e.g., an eNB, a relay station, etc.), as described below, or by some other entity. The first base station may generate an overhead channel comprising information for the first base station (block 1012). The overhead channel may comprise any of the channels and signals described above. The first base station may send the overhead channel in a first time interval (block 1014). The overhead channel may also be sent from a second base station (e.g., an eNB, a relay station, etc.) in a second time interval that may be non-overlapping with the first time interval.

For subframe offset, the first and second time intervals may belong in non-overlapping subframes with the same subframe index determined based on different frame timing for the two base stations, e.g., as shown in FIG. 4A. For symbol offset, the first and second time intervals may cover non-overlapping symbol periods with the same symbol period index determined based on different frame timing, e.g., as shown in FIG. 5A. For subframe offset and symbol offset, the first and second time intervals may belong in non-overlapping subframes with the same subframe index or may cover non-overlapping symbol periods with the same symbol period index determined based on different frame timing, e.g., as shown in FIG. 6. For TDM, the first and second time intervals may cover non-overlapping symbol periods with different symbol period indices determined based on the same frame timing, e.g., as shown in FIG. 7.

The first base station may reduce its transmit power during the second time interval in order to reduce interference to the overhead channel from the second base station (block 1016). The first base station may lower its transmit power (possibly to zero) or may spatially steer its transmission away from one or more UEs. The first base station may also set a subframe comprising the second time interval as an MBSFN subframe, transmit control information for the MBSFN subframe in the subframe, and not transmit in the remaining part of the subframe.

The first base station may send data to at least one UE in a third time interval that may be non-overlapping with the first and second time intervals (block 1018). The second base station may reduce its transmit power during the third time interval in order to reduce interference to the data from the first base station.

FIG. 11 shows a design of an apparatus 1100 for sending an overhead channel in a wireless communication network. Apparatus 1100 includes a module 1112 to generate an overhead channel comprising information for a first base station, a module 1114 to send the overhead channel from the first base station in a first time interval, with the overhead channel being sent from a second base station in a second time interval non-overlapping with the first time interval, a module 1116 to reduce transmit power of the first base station during the second time interval to reduce interference to the overhead channel from the second base station, and a module 1118 to send data from the first base station in a third time interval non-overlapping with the first and second time intervals, with the second base station reducing transmit power during the third time interval to reduce interference to the data from the first base station.

The modules in FIGS. 9 and 11 may comprise processors, electronics devices, hardware devices, electronics components, logical circuits, memories, software codes, firmware codes, etc., or any combination thereof.

Figure 12:
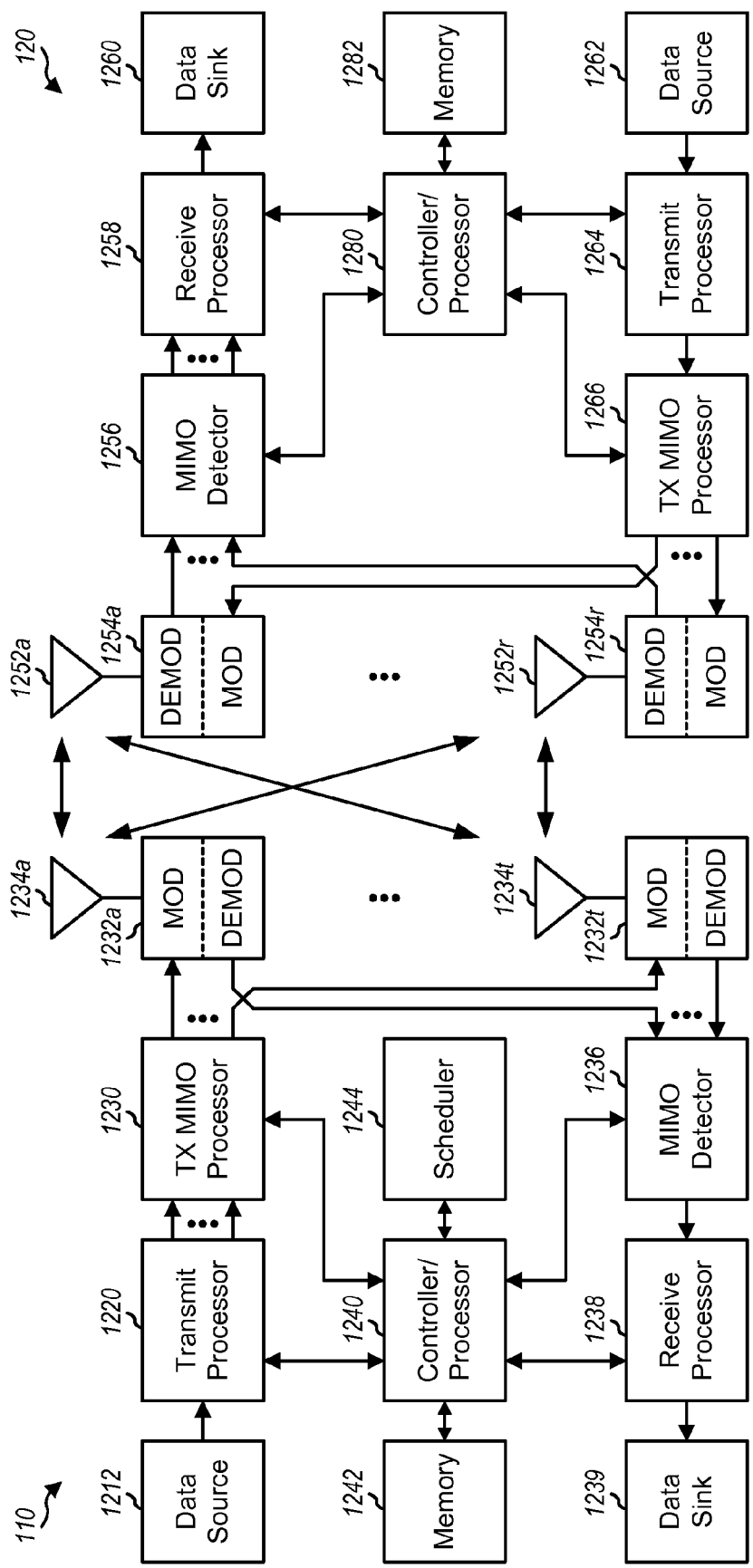
FIG. 12 shows a block diagram of a base station and a UE.

FIG. 12 shows a block diagram of a design of a base station/eNB 110 and a UE 120, which may be one of the base stations/eNBs and one of the UEs in FIG. 1. Base station 110 may be equipped with T antennas 1234a through 1234t, and UE 120 may be equipped with R antennas 1252a through 1252r, where in general $T \geq 1$ and $R \geq 1$.

At base station 110, a transmit processor 1220 may receive data for one or more UEs from a data source 1212, process (e.g., encode, interleave, and modulate) the data, and provide data symbols. Transmit processor 1220 may also receive information for overhead channels from a controller/processor 1240, process the information, and provide overhead symbols. A transmit (TX) multiple-input multiple-output (MIMO) processor 1230 may perform spatial processing (e.g., preceding) on the data symbols, the overhead symbols, and/or pilot symbols, if applicable, and may provide T output symbol streams to T modulators (MODS) 1232a through 1232t. Each modulator 1232 may process a respective output symbol stream (e.g., for OFDM, etc.) to obtain an output sample stream. Each modulator 1232 may further process (e.g., convert to analog, amplify, filter, and upconvert) the output sample stream to obtain a downlink signal. T downlink signals from modulators 1232a through 1232t may be transmitted via T antennas 1234a through 1234t, respectively.

At UE 120, antennas 1252a through 1252r may receive the downlink signals from base station 110 and may provide received signals to demodulators (DEMODs) 1254a through 1254r, respectively. Each demodulator 1254 may condition (e.g., filter, amplify, downconvert, and digitize) a respective received signal to obtain received samples. Each demodulator 1254 may further process the received samples (e.g., for OFDM, etc.) to obtain received symbols. A MIMO detector 1256 may obtain received symbols from all R demodulators 1254a through 1254r, perform MIMO detection on the received symbols if applicable, and provide detected symbols. A receive processor 1258 may process (e.g., demodulate, deinterleave, and decode) the detected symbols, provide decoded data for UE 120 to a data sink 1260, and provide decoded information for overhead channels to a controller/processor 1280.

On the uplink, at UE 120, a transmit processor 1264 may receive and process data from a data source 1262 and control information from controller/processor 1280. The symbols from transmit processor 1264 may be precoded by a TX MIMO processor 1266 if applicable, further processed by modulators 1254a through 1254r, and transmitted to base station 110. At base station 110, the uplink signals from UE 120 may be received by antennas 1234, processed by demodulators 1232, detected by a MIMO detector 1236 if applicable, and further processed by a receive processor 1238 to obtain the data and control information sent by UE 120.

Controllers/processors 1240 and 1280 may direct the operation at base station 110 and UE 120, respectively. Processor 1240 and/or other processors and modules at base station 110 may perform or direct process 1000 in FIG. 10 and/or other processes for the techniques described herein. Processor 1280 and/or other processors and modules at UE 120 may perform or direct process 800 in FIG. 8 and/or other processes for the techniques described herein. Memories 1242 and 1282 may store data and program codes for base station 110 and UE 120, respectively. A scheduler 1244 may schedule UEs for data transmission on the downlink and uplink and may provide resource grants for the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   receiving an overhead channel from a first base station in a first time interval, the overhead channel being sent from a second base station in a second time interval non-overlapping with the first time interval; and
   processing the overhead channel from the first base station to recover information for the first base station, wherein the second base station sets a subframe comprising the first time interval as a Multicast Broadcast Multimedia Services (MBMS) Single Frequency Network (MBSFN) subframe, transmits control information for the MBSFN subframe in the subframe, and does not transmit in remaining part of the subframe.

2. A method for wireless communication, comprising:
   receiving an overhead channel from a first base station in a first time interval, the overhead channel being sent from a second base station in a second time interval non-overlapping with the first time interval;
   processing the overhead channel from the first base station to recover information for the first base station;
   receiving a reference signal from the first base station in a third time interval, the reference signal being sent from the second base station in a fourth time interval non-overlapping with the third time interval; and
   processing the reference signal from the first base station to obtain channel information for the first base station.

3. A method for wireless communication, comprising:
   generating an overhead channel comprising information for a first base station;
   sending the overhead channel from the first base station in a first time interval, the overhead channel being sent from a second base station in a second time interval non-overlapping with the first time interval;
   setting a subframe comprising the second time interval as a Multicast Broadcast Multimedia Services (MBMS) Single Frequency Network (MBSFN) subframe;
   transmitting control information for the MBSFN subframe in the subframe; and
   not transmitting in remaining part of the subframe.

4. An apparatus for wireless communication, comprising:
   means for receiving an overhead channel from a first base station in a first time interval, the overhead channel being sent from a second base station in a second time interval non-overlapping with the first time interval; and
   means for processing the overhead channel from the first base station to recover information for the first base station, wherein the second base station sets a subframe comprising the first time interval as a Multicast Broadcast Multimedia Services (MBMS) Single Frequency Network (MBSFN) subframe, transmits control information for the MBSFN subframe in the subframe, and does not transmit in remaining part of the subframe.

5. An apparatus for wireless communication, comprising:
   means for receiving an overhead channel from a first base station in a first time interval, the overhead channel being sent from a second base station in a second time interval non-overlapping with the first time interval;
   means for processing the overhead channel from the first base station to recover information for the first base station;
   means for receiving a reference signal from the first base station in a third time interval, the reference signal being sent from the second base station in a fourth time interval non-overlapping with the third time interval; and
   means for processing the reference signal from the first base station to obtain channel information for the first base station.

6. An apparatus for wireless communication, comprising:
   at least one processor configured to receive an overhead channel from a first base station in a first time interval, the overhead channel being sent from a second base station in a second time interval non-overlapping with the first time interval, and to process the overhead channel from the first base station to recover information for the first base station, wherein the second base station sets a subframe comprising the first time interval as a Multicast Broadcast Multimedia Services (MBMS) Single Frequency Network (MBSFN) subframe, transmits control information for the MBSFN subframe in the subframe, and does not transmit in remaining part of the subframe.

7. An apparatus for wireless communication, comprising:
   at least one processor configured to receive an overhead channel from a first base station in a first time interval, the overhead channel being sent from a second base station in a second time interval non-overlapping with the first time interval, to process the overhead channel from the first base station to recover information for the first base station, to receive a reference signal from the first base station in a third time interval, the reference signal being sent from the second base station in a fourth time interval non-overlapping with the third time interval, and to process the reference signal from the first base station to obtain channel information for the first base station.

8. A computer program product, comprising:
   a non-transitory computer-readable medium comprising:
   code for causing at least one computer to receive an overhead channel from a first base station in a first time interval, the overhead channel being sent from a second base station in a second time interval non-overlapping with the first time interval; and
   code for causing the at least one computer to process the overhead channel from the first base station to recover information for the first base station, wherein the second base station sets a subframe comprising the first time interval as a Multicast Broadcast Multimedia Services (MBMS) Single Frequency Network (MBSFN) subframe, transmits control information for the MBSFN subframe in the subframe, and does not transmit in remaining part of the subframe.

9. A computer program product, comprising:

a non-transitory computer-readable medium comprising:

code for causing at least one computer to receive an overhead channel from a first base station in a first time interval, the overhead channel being sent from a second base station in a second time interval non-overlapping with the first time interval;

code for causing the at least one computer to process the overhead channel from the first base station to recover information for the first base station;

code for receiving a reference signal from the first base station in a third time interval, the reference signal being sent from the second base station in a fourth time interval non-overlapping with the third time interval; and code for processing the reference signal from the first base station to obtain channel information for the first base station.

10. An apparatus for wireless communication, comprising:

means for generating an overhead channel comprising information for a first base station;

means for sending the overhead channel from the first base station in a first time interval, the overhead channel being sent from a second base station in a second time interval non-overlapping with the first time interval;

means for setting a subframe comprising the second time interval as a Multicast Broadcast Multimedia Services (MBMS) Single Frequency Network (MBSFN) subframe; and means for transmitting control information for the MBSFN subframe in the subframe and not transmitting in remaining part of the subframe.

11. An apparatus for wireless communication, comprising:

at least one processor configured to:

generate an overhead channel comprising information for a first base station;

send the overhead channel from the first base station in a first time interval, the overhead channel being sent from a second base station in a second time interval non-overlapping with the first time interval;

set a subframe comprising the second time interval as a Multicast Broadcast Multimedia Services (MBMS) Single Frequency Network (MBSFN) subframe; and transmit control information for the MBSFN subframe in the subframe and not transmit in remaining part of the subframe.

12. A computer program product, comprising:

a non-transitory computer-readable medium comprising:

code for causing at least one computer to generate an overhead channel comprising information for a first base station;

code for causing the at least one computer to send the overhead channel from the first base station in a first time interval, the overhead channel being sent from a second base station in a second time interval non-overlapping with the first time interval;

code for causing the at least one computer to set a subframe comprising the second time interval as a Multicast Broadcast Multimedia Services (MBMS) Single Frequency Network (MBSFN) subframe; and code for causing the at least one computer to transmit control information for the MBSFN subframe in the subframe and not transmit in remaining part of the subframe.

* * * * *